US012247704B2

(12) United States Patent
Jung et al.

(10) Patent No.: US 12,247,704 B2
(45) Date of Patent: Mar. 11, 2025

(54) FLUID STORAGE CONTAINER

(71) Applicants: HYUNDAI MOTOR COMPANY, Seoul (KR); KIA CORPORATION, Seoul (KR)

(72) Inventors: Se Kwon Jung, Seoul (KR); Jun Sung Ahn, Yongin-si (KR); Sang Moo Han, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 64 days.

(21) Appl. No.: 18/130,782

(22) Filed: Apr. 4, 2023

(65) Prior Publication Data

US 2023/0341090 A1 Oct. 26, 2023

(30) Foreign Application Priority Data

Apr. 26, 2022 (KR) ........................ 10-2022-0051475
Dec. 15, 2022 (KR) ........................ 10-2022-0176138

(51) Int. Cl.
*F17C 3/04* (2006.01)

(52) U.S. Cl.
CPC ........ *F17C 3/04* (2013.01); *F17C 2201/0157* (2013.01); *F17C 2203/014* (2013.01);
(Continued)

(58) Field of Classification Search
CPC ................ F17C 3/04; F17C 2201/0157; F17C 2221/012; F17C 2223/0161;
(Continued)

(56) References Cited

U.S. PATENT DOCUMENTS

| | | | | |
|---|---|---|---|---|
| 2,256,673 A * | 9/1941 | Hansen | F17C 13/086 376/289 |
| 2,814,410 A * | 11/1957 | Hansen | F17C 13/086 105/362 |

(Continued)

FOREIGN PATENT DOCUMENTS

| | | | | |
|---|---|---|---|---|
| CN | 106574744 B * | 5/2020 | F17C 3/08 |
| KR | 101492052 B1 | 2/2015 | |

(Continued)

*Primary Examiner* — Robert J Hicks
(74) *Attorney, Agent, or Firm* — Lempia Summerfield Katz LLC

(57) ABSTRACT

A fluid storage container includes an inner vessel part having a first interior space (S1) for storing a fluid, an outer vessel part having a second interior space (S2) that accommodates the inner vessel part and spaced apart from the inner vessel part outwards, and a suspension part provided between the inner vessel part and the outer vessel part, one side of which contacts the inner vessel part, and an opposite side of which contacts the outer vessel part. The suspension part includes an inner member, one end of which is coupled to the inner vessel part and which extends from the one end thereof outwards, and an outer member, one end of which is coupled to the outer vessel part, which extends from the one side thereof inwards, and coupled to the inner member. The outer member is formed of a material having a thermal conductivity that is lower than that of the inner member.

18 Claims, 11 Drawing Sheets

(52) U.S. Cl.
CPC ................. *F17C 2203/0629* (2013.01); *F17C 2203/0636* (2013.01); *F17C 2203/066* (2013.01); *F17C 2221/012* (2013.01); *F17C 2223/0161* (2013.01)

(58) Field of Classification Search
CPC ...... F17C 2223/0153; F17C 2203/0629; F17C 2203/0626; F17C 2203/0636; F17C 2203/066; F17C 2203/014; F17C 2203/01; B65D 81/3806
USPC ..... 220/560.1, 560.05, 560.04, 23.89, 23.87, 220/23.83; 206/0.6
See application file for complete search history.

(56) References Cited

U.S. PATENT DOCUMENTS

| | | | | | |
|---|---|---|---|---|---|
| 2,858,136 | A * | 10/1958 | Rind | B60P 3/222 | 280/832 |
| 2,952,380 | A * | 9/1960 | Hampton | F17C 13/086 | 248/146 |
| 3,101,862 | A * | 8/1963 | Matsch | F17C 3/08 | 220/560.13 |
| 3,487,971 | A * | 1/1970 | Gay | F17C 13/088 | 62/51.1 |
| 3,827,135 | A * | 8/1974 | Yamamoto | F17C 13/082 | 220/560.08 |
| 4,343,413 | A * | 8/1982 | Chatzipetros | F17C 13/086 | 220/4.25 |
| 5,012,948 | A * | 5/1991 | Van Den Bergh | F17C 13/087 | 505/892 |
| 6,708,502 | B1 * | 3/2004 | Aceves | F17C 3/08 | 220/560.08 |
| 2006/0096209 | A1 * | 5/2006 | Dhellemmes | B63B 25/16 | 52/405.3 |
| 2014/0263355 | A1 * | 9/2014 | Verhulst | F17C 3/08 | 251/356 |
| 2023/0090979 | A1 * | 3/2023 | Matthews | F17C 3/08 | 220/560.04 |

FOREIGN PATENT DOCUMENTS

| | | | | |
|---|---|---|---|---|
| KR | 101933056 B1 | | 12/2018 | |
| KR | 102302667 B1 | | 9/2021 | |
| WO | WO-2021034692 A1 | * | 2/2021 | F17C 13/086 |

* cited by examiner

FLUID STORAGE CONTAINER

CROSS-REFERENCE TO RELATED APPLICATION

This application claims the benefit of priority to Korean Patent Application Nos. 10-2022-0051475 and 10-2022-0176138, filed in the Korean Intellectual Property Office on Apr. 26, 2022 and Dec. 15, 2022, respectively, the entire contents of which are incorporated herein by reference.

TECHNICAL FIELD

The present disclosure relates to a fluid storage container, and more particularly, to a fluid storage container that may store a fluid, such as hydrogen, which needs to be stored in a cryogenic state.

BACKGROUND

A storage container (hereinafter, "a cryogenic storage container") that stores a fluid, such as hydrogen, in a cryogenic state needs to prevent the introduction of thermal energy from the outside. To achieve this, insulating components for preventing heat exchange with the outside are provided in a cryogenic storage container. For example, according to conventional technology, a structure that surrounds the outside of an inner container with an insulating material or a structure that maintains a space between the inner container and an outer container in a vacuum state is applied to a cryogenic storage container.

An apparatus that protects an inner container is necessary for a cryogenic storage container to stably store fluid in a cryogenic state, which is stored in an interior thereof. According to conventional technology, a suspension apparatus that connects an inner container and an outer container and defines an empty space between the inner container and the outer container to minimize contact between the inner container and the outer container is provided in a cryogenic storage container.

However, according to conventional technology, because the suspension apparatus connects the inner container and the outer container, a portion of external thermal energy is introduced into the inner container via the suspension apparatus whereby the suspension apparatus deteriorates the insulation performance of the cryogenic storage container.

Furthermore, according to conventional technology, when the cryogenic storage container is exposed to a cryogenic state and is thermally contracted, changes in sizes between the suspension apparatus and the inner container, between the suspension apparatus and the outer container, and between internal components of the suspension apparatus occur whereby structural robustness of the cryogenic storage container is degraded.

SUMMARY

The present disclosure has been made to solve the above-mentioned problems occurring in the prior art while advantages achieved by the prior art are maintained.

An aspect of the present disclosure solves a problem of an insulating property of a cryogenic storage container being degraded by a suspension apparatus.

Another aspect of the present disclosure solves a problem of structural robustness of a cryogenic storage container being degraded by thermal contraction of a cryogenic storage container.

The technical problems to be solved by the present disclosure are not limited to the aforementioned problems, and any other technical problems not mentioned herein should be clearly understood from the following description by those having ordinary skill in the art to which the present disclosure pertains.

According to an aspect of the present disclosure, a fluid storage container includes an inner vessel part having a first interior space (S1) for storing a fluid, an outer vessel part having a second interior space (S2) that accommodates the inner vessel part, the outer vessel part being spaced apart from the inner vessel part outwards, and a suspension part provided between the inner vessel part and the outer vessel part, one side of the suspension part contacting the inner vessel part and an opposite side of the suspension part contacting the outer vessel part. The suspension part includes an inner member, one end of which is coupled to and extends outward from the inner vessel part, and an outer member, one end of which is coupled to and extends inward from the outer vessel part, the outer member being coupled to the inner member. The outer member is formed of a material having a thermal conductivity that is lower than that of the inner member.

A thermal expansion coefficient of the outer member may be higher than a thermal expansion coefficient of the inner member.

The inner member may include a metallic material, and the outer member may include a polymer material.

A recessed area having a recessed shape may be formed in an area of the outer member that faces the inner member. The inner member may be inserted into the recessed area of the outer member.

A first planar section may be formed at a portion of a circumferentially outer surface of an area of the inner member that is inserted into the recessed area, and a second planar section having a shape corresponding to the first planar section may be formed in an area of an inner surface of the recessed area, which faces the first planar section.

A first convex-concave section protruding outwards or recessed inwards may be formed at the portion of the circumferentially outer surface of the area of the inner member, which is inserted into the recessed area. A second convex-concave section having a shape corresponding to the first convex-concave section may be formed in an area of an inner surface of the recessed area, which faces the first convex-concave section. Any one of the first convex-concave section and the second convex-concave section may be inserted into the other one of the first convex-concave section and the second convex-concave section.

The inner vessel part may include an inner body defining the first interior space (S1) and an inner coupling area provided on one side of the inner body, into which the inner member is inserted and coupled thereto, the inner coupling area having a shape corresponding to the inner member.

A first planar part may be formed in an area of a circumferentially outer surface of the inner member, the first planar part being inserted into the inner coupling area. A second planar part having a shape corresponding to the first planar part may be formed in an area of an inner surface of the inner coupling area, which faces the first planar part.

A first convex-concave part protruding outwards or recessed inwards may be formed in an area of a circumferentially outer surface of the inner member, which is inserted into the inner coupling area, a second convex-concave part having a shape corresponding to the first convex-concave part may be formed on an inner surface of the inner coupling area, and any one of the first convex-concave part and the second convex-concave part may be inserted into the other one of the first convex-concave part and the second convex-concave part.

The inner coupling area may have a shape protruding from the inner body toward the inner member.

The inner coupling area may have a shape recessed from the inner body into the first interior space (S1).

The outer vessel part may include an outer body defining the second interior space (S2), and an outer coupling area provided on one side of the outer body, into which the outer member is inserted and coupled thereto, the outer coupling area having a shape corresponding to the outer member.

The suspension part may include a first suspension part and a second suspension part, and one or more of the first suspension part and the second suspension part may be movable with respect to the inner coupling area or the outer coupling area.

The fluid storage container may further include a pipeline member coupled to one side of the inner vessel part, in communication with the first interior space (S1), and provided adjacent to the first suspension part. The first suspension part may be fixedly coupled to the inner coupling area or the outer coupling area.

The suspension part may further include a spring member provided in the outer coupling area and provided between the outer body and the outer member.

The suspension part may further include a ring member surrounding an outer peripheral surface of the outer member. The outer member may further include a protruding area having a shape that extends along a circumferential direction of the outer member on an outer peripheral surface of the outer member and provided between the ring member and the outer vessel part.

A cross-section of the inner member, obtained when the first planar section may be cut perpendicularly to the first planar section, may have a polygonal shape. A cross-section of the outer member, obtained when the second planar section may be cut perpendicularly to the second planar section, may have a polygonal shape.

A cross-section of the inner member, obtained when the first planar part may be cut perpendicularly to the first planar part, may have a polygonal shape. A cross-section of the inner vessel part, obtained when the second planar part may be cut perpendicularly to the second planar part, may have a polygonal shape.

BRIEF DESCRIPTION OF THE DRAWINGS

The above and other objects, features, and advantages of the present disclosure should be more apparent from the following detailed description taken in conjunction with the accompanying drawings.

DETAILED DESCRIPTION

Hereinafter, a fluid storage container according to the present disclosure is described with reference to the drawings.

When a component, device, element, or the like of the present disclosure is described as having a purpose or performing an operation, function, or the like, the component, device, or element should be considered herein as being "configured to" meet that purpose or to perform that operation or function.

Figure 1:
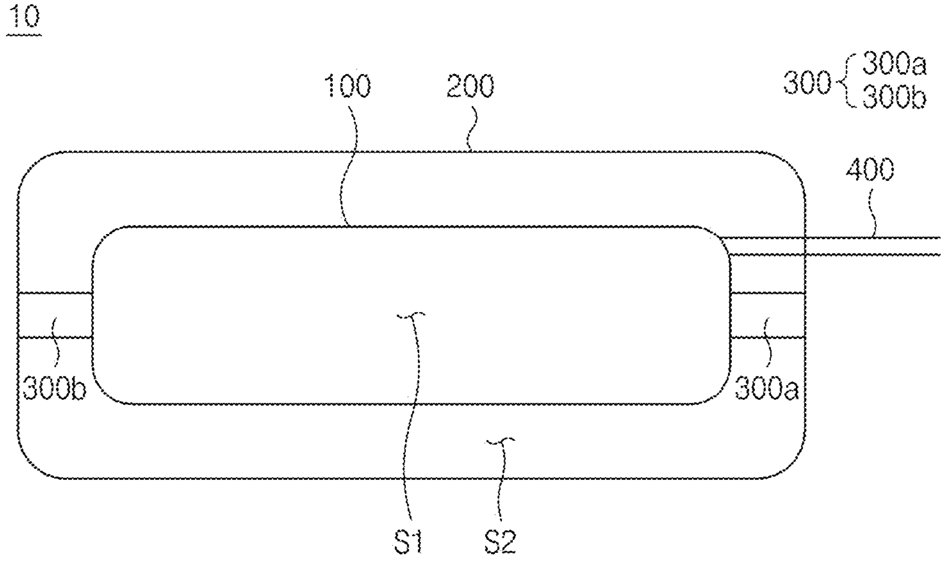
FIG. 1 is a cross-sectional view schematically illustrating a structure of a fluid storage container according to an embodiment of the present disclosure.
Figure 2:
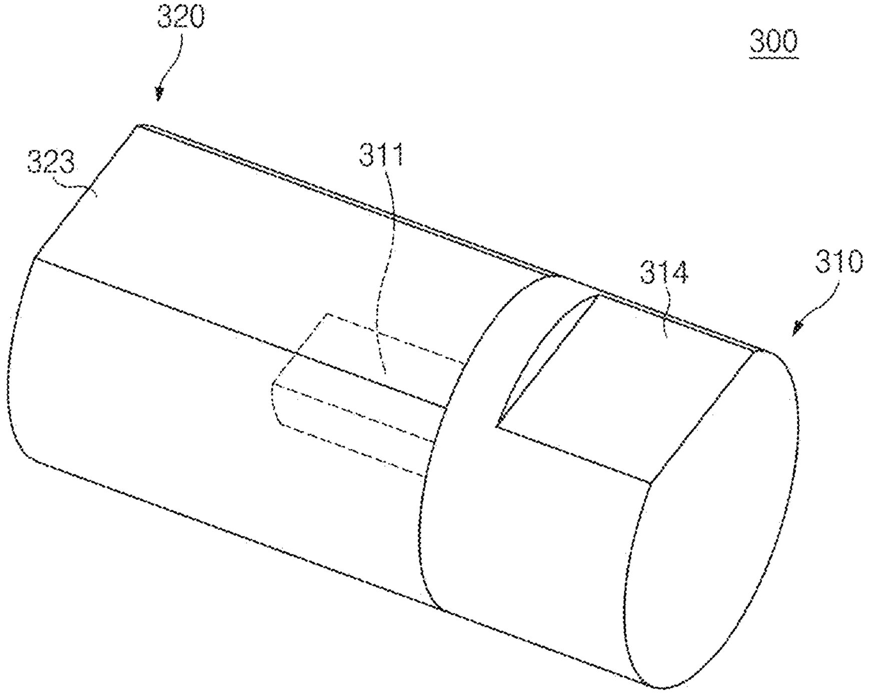
FIG. 2 is a perspective view illustrating a suspension part according to a first embodiment of the present disclosure.
Figure 3:
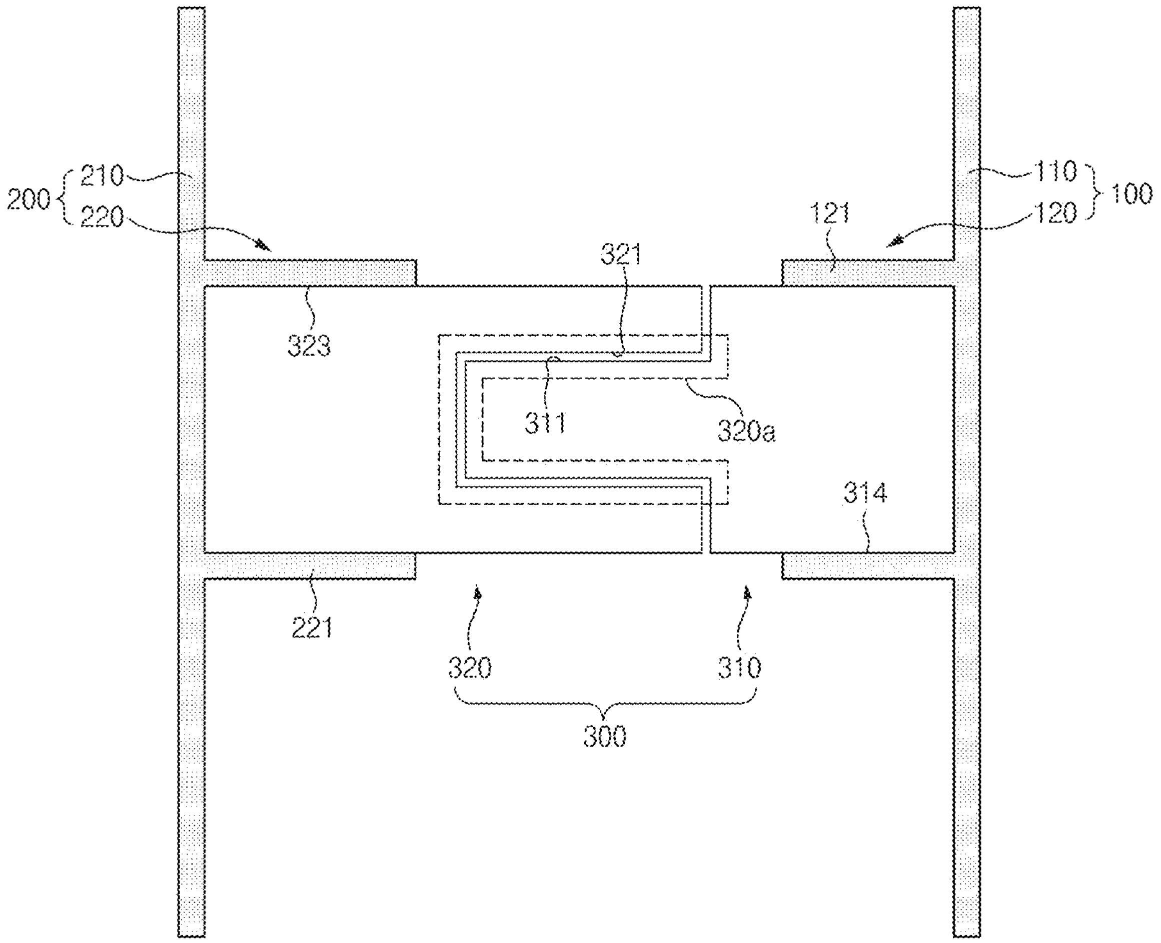
FIG. 3 is a cross-sectional view illustrating an example of a state in which a suspension part is coupled to an inner vessel part and an outer vessel part, according to the first embodiment of the present disclosure.
Figure 4:
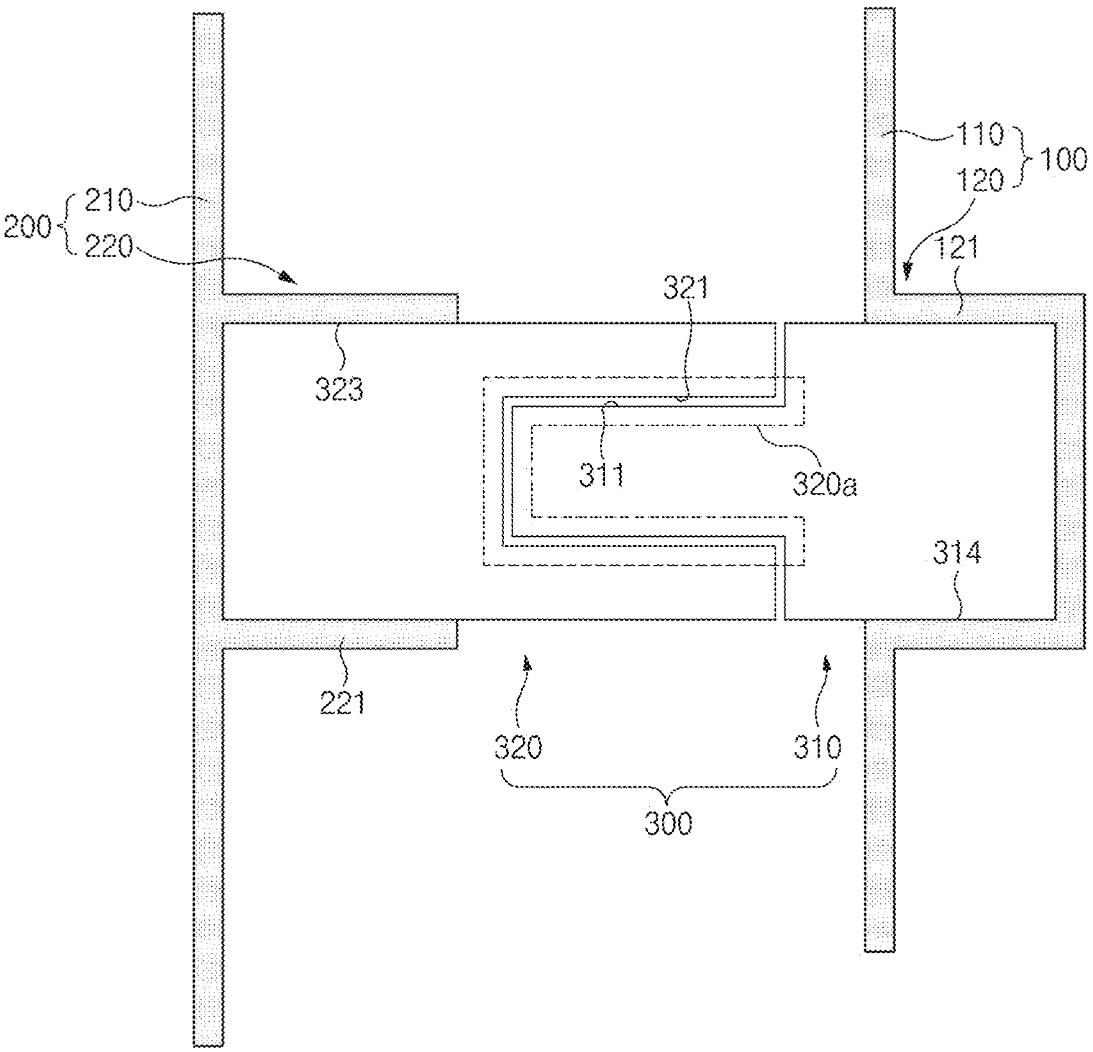
FIG. 4 is a cross-sectional view illustrating another example of a state in which a suspension part is coupled to an inner vessel part and an outer vessel part, according to another embodiment of the present disclosure.

FIG. 1 is a cross-sectional view schematically illustrating a structure of a fluid storage container according to an embodiment of the present disclosure. FIG. 2 is a perspective view illustrating a suspension part according to a first embodiment of the present disclosure. FIG. 3 is a cross-sectional view illustrating an example of a state in which the suspension part is coupled to an inner vessel part and an outer vessel part, according to the first embodiment of the present disclosure. FIG. 4 is a cross-sectional view illustrating another example of a state in which a suspension part is coupled to an inner vessel part and an outer vessel part, according to another embodiment of the present disclosure.

A fluid storage container 10 according to the present disclosure may be a configuration for storing a fluid in a cryogenic state. As an example, the above-described fluid may include at least one of a gas, a liquid, or any combination thereof. Furthermore, the above-described fluid may be a liquid. As a detailed example, the above-described fluid may include at least one of hydrogen in a gaseous state, hydrogen in a liquid state, or any combination thereof, and may be beneficial to be liquefied hydrogen that is hydrogen in a liquid state. In a more detailed example, the fluid may be: liquefied hydrogen, in which at least a portion of the hydrogen in the gaseous state is liquefied; hydrogen in the gaseous state, in which the hydrogen is not liquefied; or may be liquefied hydrogen that is liquefied in a state, in which the entire hydrogen in the gaseous state is in a cryogenic state. In other words, the fluid may be understood as a concept including the hydrogen in the liquid state and the hydrogen in the gaseous state or a concept including only the hydrogen in the liquid state. However, the contents merely correspond to an example, and a kind of the fluid according to the present disclosure is not limited only to hydrogen, and may be understood as a concept including an arbitrary material in a cryogenic state.

Referring to FIGS. 1-4, the fluid storage container 10 according to the present disclosure may include an inner vessel part 100 that has a first interior space S1 for storing a fluid, an outer vessel part 200 that has a second interior space S2 that accommodates the inner vessel part 100 and is spaced apart from the inner vessel part 100 outwards, and a suspension part 300 that is provided between the inner vessel part 100 and the outer vessel part 200, one side of which contacts the inner vessel part 100, and an opposite side of which contacts the outer vessel part 200.

The outer vessel part 200 may be a configuration for insulating the inner vessel part 100 from the outside while protecting the inner vessel part 100 from an external environment. Although not illustrated in the drawings, to enhance the insulation performance of the inner vessel part 100, an empty space between the inner vessel part 100 and the outer vessel part 200 may be provided with an insulating material and may be maintained in a vacuum insulation state. Furthermore, the suspension part 300 may be an impact-absorbing configuration for minimizing an external impact from being delivered to the inner vessel part 100 while fixing the inner vessel part 100 to the outer vessel part 200.

Referring now to FIGS. 1-4, the suspension part 300 may include an inner member 310, one end of which is coupled to the inner vessel part 100 and that extends from the one end thereof outwards. The suspension part 300 may also include an outer member 320, one end of which is coupled to the outer vessel part 200 and that extends from the one end thereof inwards to be coupled to the inner member 310.

According to the present disclosure, the inner member 310 and the outer member 320 may be formed of different materials. In more detail, a thermal conductivity of the outer member 320 may be formed of a material having a thermal conductivity that is lower than that of the inner member 310.

As described above, the suspension part 300 is a configuration that connects the inner vessel part 100 and the outer vessel part 200. Accordingly, thermal energy outside the fluid storage container 10 may be introduced into the first interior space S1 via the outer vessel part 200, the suspension part 300, and the inner vessel part 100. However, according to the present disclosure, because the thermal conductivity of the outer member 320 is relatively low, transfer of the thermal energy introduced from the outside to the inner vessel part 100 through the suspension part 300 may be minimized. As an example, the inner member 310 may include a metallic member, and the outer member 320 may include a polymer material. The above-described polymer material may be polyether ether ketone (PEEK), polyimide, or epoxy, but the kind of polymer material is not limited to the above-described contents. As an example, the above-described epoxy may be G10-based epoxy.

Referring now to FIGS. 1-4, a recessed area 320*a* having a recessed shape may be formed in an area of the outer member 320 that faces the inner member 310. The inner member 310 and the outer member 320 may be coupled to each other by inserting a portion of the inner member 310 into the recessed area 320*a* of the outer member 320. As a result, according to the present disclosure, a thermal expansion coefficient of the outer member 320 may be higher than a thermal expansion coefficient of the inner member 310.

As described above, the fluid storage container 10 may be a configuration for storing the fluid in the cryogenic state. Accordingly, the fluid storage container 10 is exposed to a cryogenic environment. In this case, the suspension part 300 also is exposed to the cryogenic state, and thus, thermal contraction occurs. When the above-described thermal contraction occurs, two different members may be spaced apart from each other in an area, in which they are coupled to each other, and thus, coupling performance may be degraded.

However, according to the present disclosure, because the thermal expansion coefficient of the outer member 320 is higher than the thermal expansion coefficient of the inner member 310, a change of the outer member 320 due to the thermal contraction is larger than a change of the inner member 310. Accordingly, according to the present disclosure, when thermal contraction occurs in the inner member 310 and the outer member 320, a coupling force between the inner member 310 and the outer member 320 in the recessed 320*a* may rather increase while not being degraded. Accordingly, coupling of the suspension part 300 may be firmly maintained even when the fluid storage container 10 is exposed to the cryogenic state.

A first planar section 311 may be formed at a portion of a circumferentially outer surface of an area of the inner member 310 that is inserted into the recessed area 320*a* of the outer member 320. A second planar section 321 having a shape corresponding to the first planar section 311 may be formed in an area of an inner surface of the recessed area 320*a* of the outer member 320 that faces the first planar section 311.

The first planar section 311 and the second planar section 321, which have been described above, may be configurations for preventing relative rotation of the inner member 310 and the outer member 320. In other words, according to the present disclosure, relative rotation of the inner member 310 and the outer member 320 may be prevented due to an interference structure between the first planar section 311 and the second planar section 321. As an example, a roughness of a specific value or more may be provided through surface treatment in an area in which the first planar section 311 and the second planar section 321 face each other. In this case, when the fluid storage container 10 is exposed to a cryogenic state to be thermally contracted, the first planar section 311 and the second planar section 321 may be engaged with each other while contacting each other. Accordingly, because a frictional force may be maximized in an area in which the first planar section 311 and the second planar section 321 are engaged with each other when a roughness of a specific value is provided in the first planar section 311 and the second planar section 321, a coupling force between the inner member 310 and the outer member 320 may be enhanced.

A plurality of first planar sections 311 may be formed in the inner member 310 and a plurality of second planar sections 321 also may be formed in the outer member 320. This may be understood that a cross-section of the inner member 310 has a polygonal shape when the first planar section 311 is cut perpendicularly to the first planar section 311, and a cross-section of the outer member 320 has a polygonal shape when the second planar section 321 is cut perpendicularly to the second planar section 321. In this case, because a plurality of first planar sections 311 and a plurality of second planar sections 321 may be formed in an area in which they face each other, relative rotation of the inner member 310 and the outer member 320 may be prevented more effectively.

Figure 5:
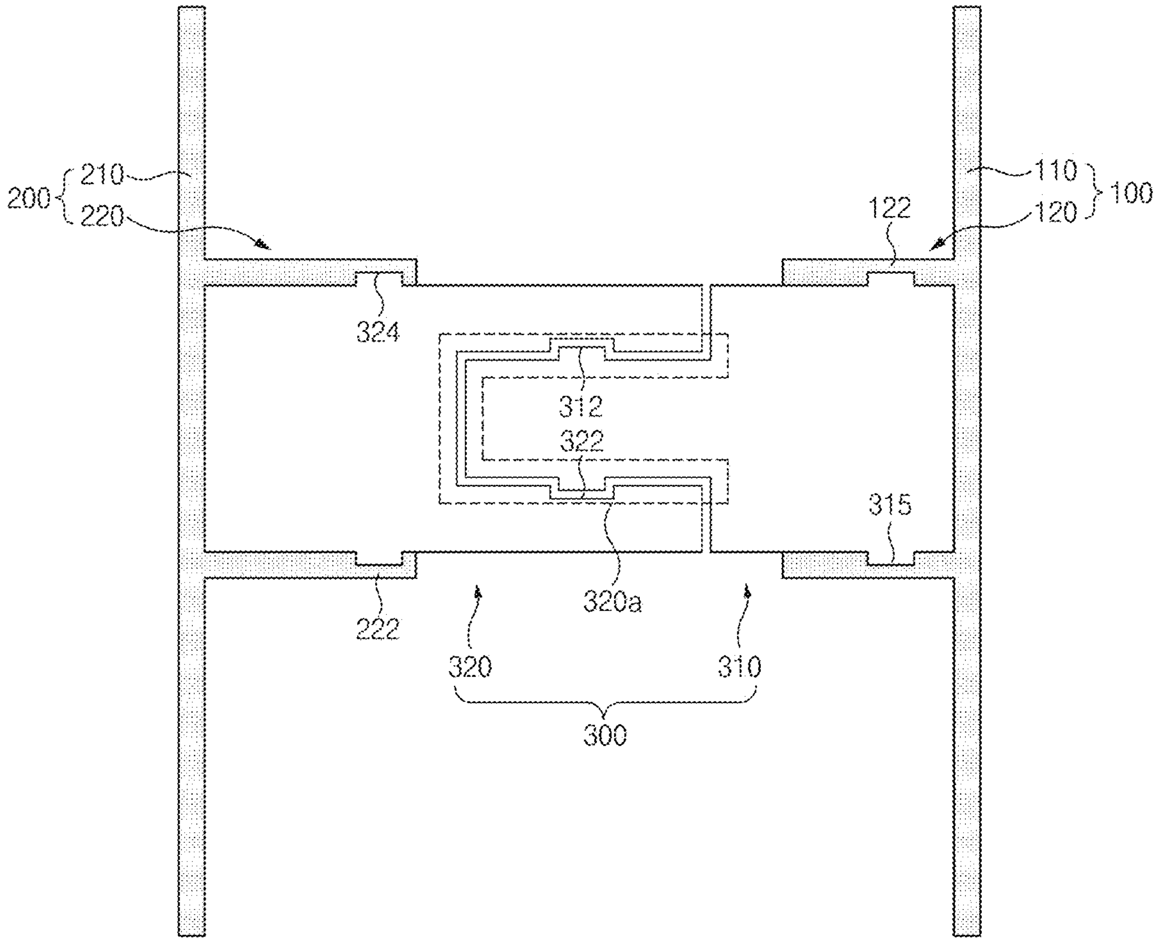
FIG. 5 is a cross-sectional view illustrating an example of a state in which a suspension part is coupled to an inner vessel part and an outer vessel part, according to a second embodiment of the present disclosure.
Figure 6:
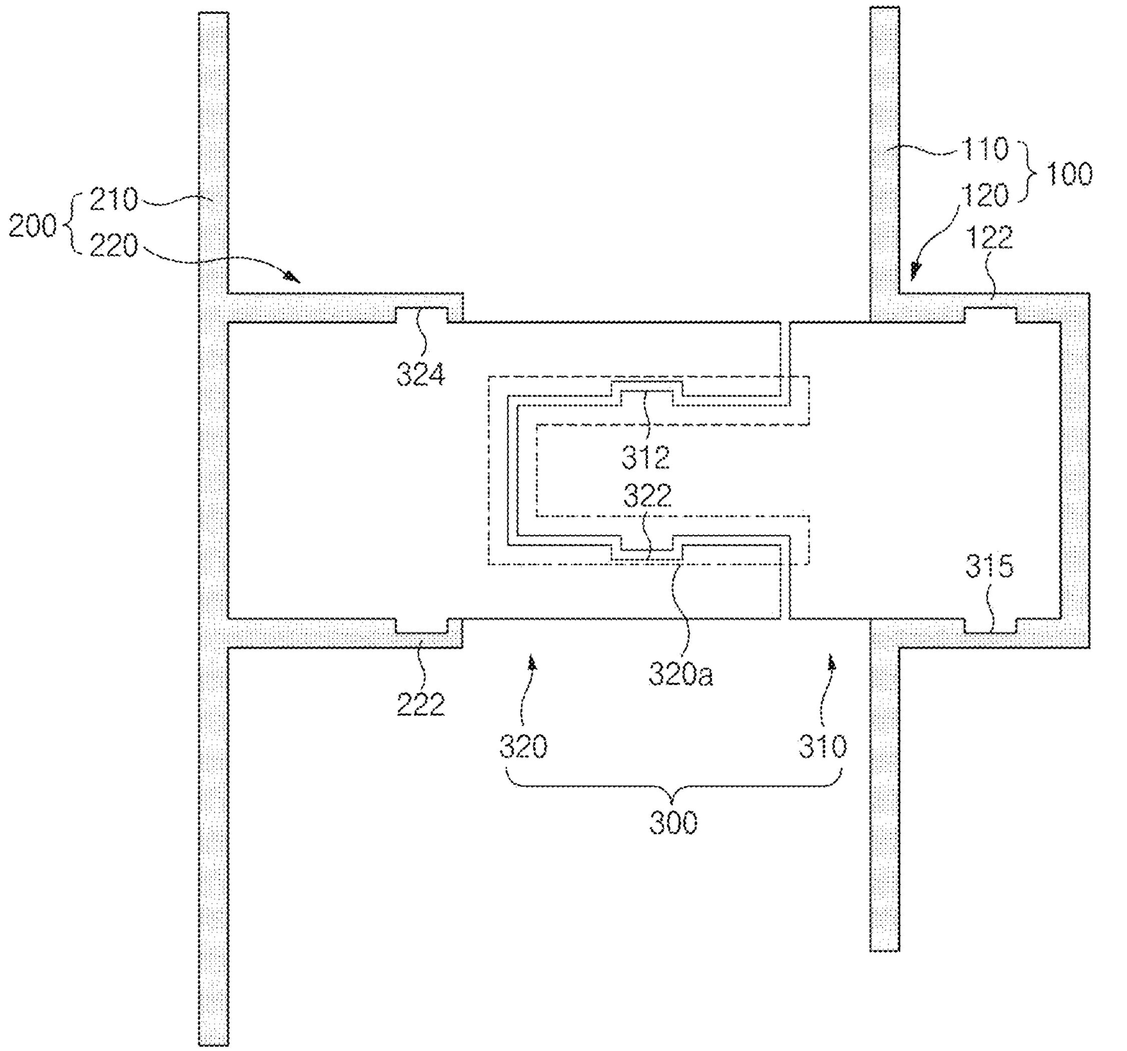
FIG. 6 is a cross-sectional view illustrating another example of a state in which a suspension part is coupled to an inner vessel part and an outer vessel part, according to the second embodiment of the present disclosure.

FIG. 5 is a cross-sectional view illustrating an example of a state in which a suspension part is coupled to an inner vessel part and an outer vessel part, according to a second embodiment of the present disclosure. FIG. 6 is a cross-sectional view illustrating another example of a state in which a suspension part is coupled to an inner vessel part and an outer vessel part, according to the second embodiment of the present disclosure.

Referring to FIGS. 5 and 6, a structure for preventing rotation of the inner member 310 and the outer member 320 also may be applied to the suspension part 300 according to the second embodiment of the present disclosure.

In more detail, according to the second embodiment of the present disclosure, a first convex-concave section 312 may be formed at a portion of a circumferentially outer surface of an area of the inner member 310 that is inserted into the recessed area 320*a* of the outer member 320. A second convex-concave section 322 having a shape corresponding to the first convex-concave section 312 may be formed in an area of an inner surface of the recessed area 320*a* of the outer member 320 that faces the first convex-concave section 312. Accordingly, any one of the first convex-concave section 312 and the second convex-concave section 322 may be inserted into and coupled to the other one of the first convex-concave section 312 and the second convex-concave section 322. FIGS. 5 and 6 illustrate a state in which the first convex-concave section 312 has a protruding shape and the second convex-concave section 322 has an inwardly recessed shape. According to the second embodiment of the present disclosure, relative rotation of the inner member 310 and the outer member 320 may be prevented due to interferences between the first convex-concave section 312 and the second convex-concave section 322.

The first convex-concave section 312 and the second convex-concave section 322 according to the second embodiment of the present disclosure may have various shapes. For example, the first convex-concave section 312 may have a shape that extends in a direction in which the inner member 310 extends, i.e., a direction in which the outer vessel part 200 is spaced apart from the inner vessel part 100, which is taken as a lengthwise direction thereof, and may have a shape that protrudes from the inner member 310. The second convex-concave section 322 may have a recessed shape corresponding to the first convex-concave section 312. In this case, this may be understood that the first convex-concave section 312 has a specific bar shape.

However, unlike the configuration described above, the first convex-concave section 312 may have a shape that extends in a circumferential direction of the inner member 310, which is a direction that is perpendicular to a direction in which the outer vessel part 200 is spaced apart from the inner vessel part 100 as a lengthwise direction thereof, and protrudes from the inner member 310. The second convex-concave section 322 may have a recessed shape corresponding to the first convex-concave section 312. This may be understood that the first convex-concave section 312 has a shape corresponding to a partial area of a ring shape when the first convex-concave section 312 extends while a circumferential direction of the inner member 310 is taken as a lengthwise direction thereof.

Furthermore, a plurality of first convex-concave sections 312 and a plurality of second convex-concave sections 322 may be formed such that the relative rotation of the inner member 310 and the outer member 320 may be prevented more effectively due to interferences between the first convex-concave sections 312 and the second convex-concave sections 322. As an example, the first convex-concave sections 312 may be formed to be spaced apart from each other along the circumferential direction of the inner member 310, and the second convex-concave sections 322 also may be formed to correspond to the plurality of first convex-concave sections 312.

Referring to FIGS. 1-6, the inner vessel part 100 may include an inner body 110 that defines the first interior space S1, and an inner coupling area 120 that is provided on one side of the inner body 110, into which the inner member 310 of the suspension part 300 is inserted to be coupled thereto. The inner coupling area 120 may have a shape corresponding to the inner member 310.

As illustrated in FIGS. 3 and 5, the inner coupling area 120 may have a shape that protrudes toward the inner member 310 (i.e., outwardly from the inner body 110). However, as illustrated in FIGS. 4 and 6, the inner coupling area 120 may have a shape that is recessed toward the first interior space S1 (i.e., recessed away from the inner member 310 or inwardly from the inner body 110).

As illustrated in FIGS. 3 and 4 again, according to the first embodiment of the present disclosure, a first planar part 314 may be formed in an area of the circumferentially outer surface of the inner member 310 that is inserted into the inner coupling area 120 of the inner vessel part 100. A second planar part 121 having a shape corresponding to the first planar part 314 may be formed in an area of an inner surface of the inner coupling area 120 of the inner vessel part 100 that faces the first planar part 314. Similar to the cases of the first planar section 311 and the second planar section 321, the first planar part 314 and the second planar part 121 may be configurations for preventing relative rotation of the inner member 310 and the inner coupling area 120.

A plurality of first planar parts 314 may be formed in the inner member 310, and a plurality of second planar parts 121 also may be formed in the inner vessel part 100. This may be understood that a cross-section of the inner member 310 has a polygonal shape when the first planar part 314 is cut perpendicularly to the first planar part 314, and a cross-section of the inner vessel part 100 has a polygonal shape when the second planar part 121 is cut perpendicularly to the second planar part 121. In this case, because a plurality of first planar parts 314 and a plurality of second planar parts 121 may be formed in an area in which they face each other, relative rotation of the inner member 310 and the inner vessel part 100 may be prevented more effectively.

As illustrated in FIGS. 5 and 6 again, according to the second embodiment of the present disclosure, a first convex-concave part 315 that protrudes outwards or is recessed inwards may be formed in an area of the circumferentially outer surface of the inner member 310 that is inserted into the inner coupling area 120 of the inner vessel part 100. A second convex-concave part 122 having a shape corresponding to the first convex-concave part 315 may be formed on an inner surface of the inner coupling area 120 of the inner vessel part 100. FIGS. 5 and 6 illustrate a state in which the first convex-concave part 315 has an outwardly protruding shape and the second convex-concave part 122 has an inwardly recessed shape. In other words, according to the second embodiment of the present disclosure, relative rotation of the inner member 310 and the inner coupling area 120 may be prevented due to interferences between the first convex-concave part 315 and the second convex-concave part 122.

The first convex-concave part 315 and the second convex-concave part 122 according to the second embodiment of the present disclosure may have various shapes. For example, the first convex-concave part 315 may have a shape that extends in a direction in which the inner member 310 extends, i.e., a direction in which the outer vessel part 200 is spaced apart from the inner vessel part 100, which is taken as a lengthwise direction thereof, and may have a shape that protrudes from the inner member 310. The second convex-concave part 122 may have a recessed shape corresponding to the first convex-concave part 315. In this case, this may be understood that the first convex-concave part 315 has a specific bar shape.

However, unlike the configuration described above, the first convex-concave part 315 may have a shape that extends in a circumferential direction of the inner member 310, which is a direction that is perpendicular to a direction in which the outer vessel part 200 is spaced apart from the inner vessel part 100 as a lengthwise direction thereof, and protrudes from the inner member 310. The second convex-concave part 122 may have a recessed shape corresponding to the first convex-concave part 315. This may be understood that the first convex-concave part 315 has a shape corresponding to a partial area of a ring shape when the first convex-concave part 315 extends while a circumferential direction of the inner member 310 is taken as a lengthwise direction thereof.

Furthermore, a plurality of first convex-concave parts 315 and a plurality of second convex-concave parts 122 may be formed such that the relative rotation of the inner member 310 and the inner vessel part 100 may be prevented more effectively due to interferences between the first convex-concave parts 315 and the second convex-concave parts 122. As an example, the first convex-concave parts 315 may be formed to be spaced apart from each other along the circumferential direction of the inner member 310, and the second convex-concave parts 122 also may be formed to correspond to the plurality of first convex-concave parts 315.

Referring to FIGS. 1-6, the outer vessel part 200 may include an outer body 210 that defines the second interior space S2, and an outer coupling area 220 that is provided on one side of the outer body 210 into which the outer member 320 is inserted to be coupled thereto. The outer coupling area 220 may have a shape corresponding to the outer member 320.

Then, as illustrated in FIGS. 3-6, the outer coupling area 220 may have a shape that protrudes toward the outer member 320.

As illustrated in FIGS. 3 and 4, according to the first embodiment of the present disclosure, a third planar part 323 may be formed in an area of the circumferentially outer surface of the outer member 320 that is inserted into the outer coupling area 220 of the outer vessel part 200. A fourth planar part 221 having a shape corresponding to the third planar part 323 may be formed in an area of an inner surface of the outer coupling area 220 of the outer vessel part 200, which faces the third planar part 323. The third planar part 323 and the fourth planar part 221 may be configurations for preventing relative rotation of the outer member 320 and the outer coupling area 220.

A plurality of third planar parts 323 may be formed in the outer member 320, and a plurality of fourth planar parts 221 also may be formed in the outer vessel part 200. This may be understood that a cross-section of the outer member 320 has a polygonal shape when the third planar part 323 is cut perpendicularly to the third planar part 323, and a cross-section of the outer vessel part 200 has a polygonal shape when the fourth planar part 221 is cut perpendicularly to the fourth planar part 221. In this case, because a plurality of third planar parts 323 and a plurality of fourth planar parts 221 may be formed in an area in which they face each other, relative rotation of the outer member 320 and the outer vessel part 200 may be prevented more effectively.

As illustrated in FIGS. 5 and 6, according to the second embodiment of the present disclosure, a third convex-concave part 324 that protrudes outwards or is recessed inwards may be formed in an area of the circumferentially outer surface of the outer member 320 that is inserted into the outer coupling area 220 of the outer vessel part 200. A fourth convex-concave part 222 having a shape corresponding to the third convex-concave part 324 may be formed on an inner surface of the outer coupling area 220 of the outer vessel part 200. FIGS. 5 and 6 illustrate a state in which the third convex-concave part 324 has an outwardly protruding shape and the fourth convex-concave part 222 has an inwardly recessed shape. According to the second embodiment of the present disclosure, relative rotation of the outer member 320 and the outer coupling area 220 may be prevented due to interferences between the third convex-concave part 324 and the fourth convex-concave part 222.

The third convex-concave part 324 and the fourth convex-concave part 222 according to the second embodiment of the present disclosure may have various shapes. For example, the third convex-concave part 324 may have a shape that extends in a direction in which the outer member 320 extends, i.e., a direction in which the outer vessel part 200 is spaced apart from the inner vessel part 100, which is taken as a lengthwise direction thereof, and may have a shape that protrudes from the outer member 320. The fourth convex-concave part 222 may have a recessed shape corresponding to the third convex-concave part 324. In this case, this may be understood that the third convex-concave part 324 has a specific bar shape.

However, unlike the configuration described above, the third convex-concave part 324 may have a shape that extends in a circumferential direction of the outer member 320, which is a direction that is perpendicular to a direction in which the outer vessel part 200 is spaced apart from the inner vessel part 100 as a lengthwise direction thereof, and protrudes from the outer member 320. The fourth convex-concave part 222 may have a recessed shape corresponding to the third convex-concave part 324. This may be understood that the third convex-concave part 324 has a shape corresponding to a partial area of a ring shape when the third convex-concave part 324 extends while a circumferential direction of the outer member 320 is taken as a lengthwise direction thereof.

Furthermore, a plurality of third convex-concave parts 324 and a plurality of fourth convex-concave parts 222 may be formed such that the relative rotation of the outer member 320 and the outer vessel part 200 may be prevented more effectively due to interferences between the third convex-concave parts 324 and the fourth convex-concave parts 222. As an example, the third convex-concave parts 324 may be formed to be spaced apart from each other along the circumferential direction of the outer member 320, and the fourth convex-concave parts 222 also may be formed to correspond to the plurality of third convex-concave parts 324.

As illustrated in FIG. 1, according to the present disclosure, the fluid storage container 10 may be provided with a plurality of suspension parts. In other words, according to the present disclosure, the suspension part 300 may include a first suspension part 300*a* and a second suspension part 300*b*. The contents of the first suspension part 300*a* and the second suspension part 300*b* are replaced by the above-described contents of the suspension part 300. FIG. 1 illustrates a state in which the first suspension part 300*a* is provided on a right side of the inner vessel part 100 and the second suspension part 300*b* is provided on a left side of the inner vessel part 100 when the fluid storage container 10 has a shape that extends in left and right directions, as an example.

According to the present disclosure, one or more of the first suspension part 300*a* and the second suspension part 300*b* may be provided to be movable with respect to the inner coupling area 120 or the outer coupling area 220. This may be for preventing generation of an excessive stress in the suspension part 300 by allowing relative movement between the suspension part 300 and the inner vessel part 100 or between the suspension part 300 and the outer vessel part 200 when the fluid storage container 10 is exposed to the cryogenic state to be thermally contracted. For example, when the first suspension part 300*a* or the second suspension part 300*b* is provided to be movable with respect to the inner coupling area 120, the inner member 310 of the first suspension part 300*a* or the second suspension part 300*b* may be provided to be slid with respect to the inner coupling area 120. Furthermore, when the first suspension part 300*a* or the second suspension part 300*b* is provided to be movable with respect to the outer coupling area 220, the outer member 320 of the first suspension part 300*a* or the second suspension part 300*b* may be provided to be slid with respect to the outer coupling area 220.

The first suspension part 300*a* or the second suspension part 300*b* may be fixedly coupled to the inner coupling area 120 or the outer coupling area 220. The above-described fixing and coupling may be made through welding.

In more detail, referring to FIG. 1 and the like, the fluid storage container 10 may further include a pipeline member 400 that is coupled to one side of the inner vessel part 100, is in communication with the first interior space S1 (i.e., fluid communication), and is provided adjacent to the first suspension part 300*a*. The first suspension part 300*a* may be fixedly coupled to the inner coupling area 120 or the outer coupling area 220. As an example, the first suspension part 300*a* may be fixedly coupled to the inner coupling area 120 or the outer coupling area 220, and the second suspension part 300*b* may be coupled to the inner coupling area 120 or the outer coupling area 220 to be movable.

Figure 7:
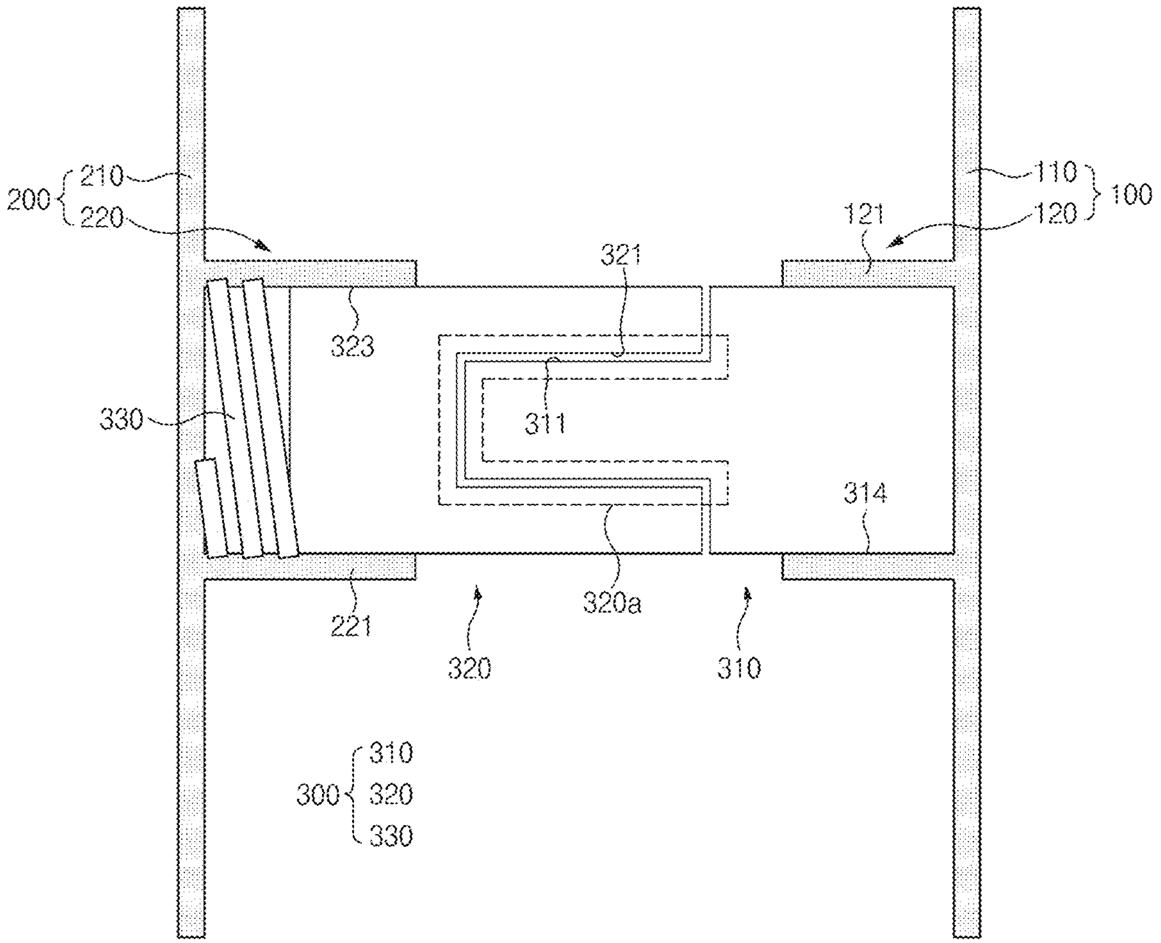
FIG. 7 is a cross-sectional view illustrating an example of a state in which a suspension part is coupled to an inner vessel part and an outer vessel part, according to a third embodiment of the present disclosure.
Figure 8:
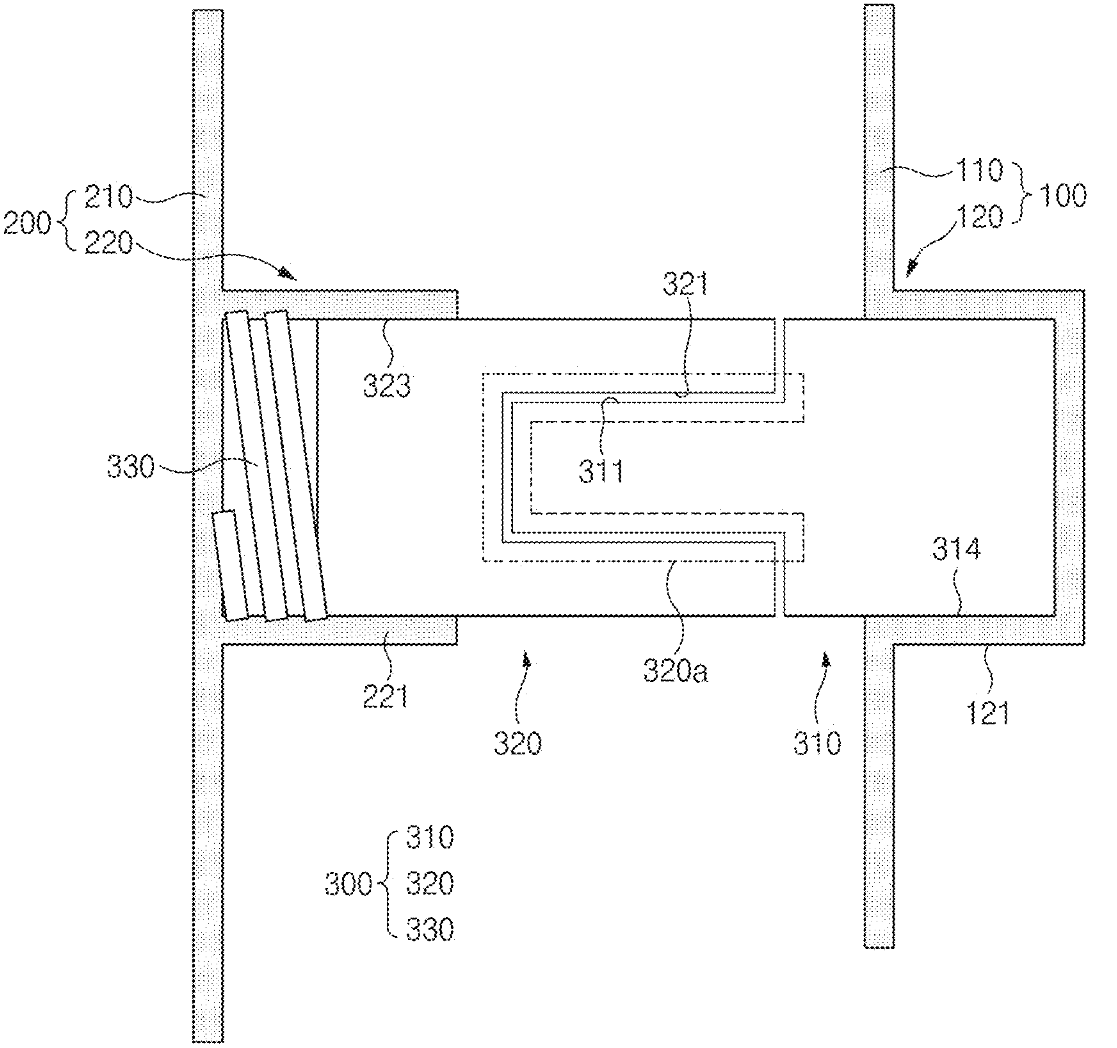
FIG. 8 is a cross-sectional view illustrating another example of a state in which a suspension part is coupled to an inner vessel part and an outer vessel part, according to the third embodiment of the present disclosure.

FIG. 7 is a cross-sectional view illustrating an example of a state in which the suspension part is coupled to an inner vessel part and an outer vessel part, according to a third embodiment of the present disclosure. FIG. 8 is a cross-sectional view illustrating another example of a state in which the suspension part is coupled to the inner vessel part and the outer vessel part, according to the third embodiment of the present disclosure.

As illustrated in FIGS. 7 and 8, according to the third embodiment of the present disclosure, the suspension part 300 may further include a spring member 330 that is provided in the outer coupling area 220 of the outer vessel part 200 and is provided between the outer body 210 and the outer member 320. The spring member 330 may be a configuration for minimizing shaking of the inner vessel part 100 due to an external force as well as compensating for a location deformation between the outer vessel part 200 and the suspension part 300 as a shape deformation corresponding to the location deformation occurs when the fluid storage container 10 is exposed to the cryogenic state. For example, the spring member 330 may have a coil shape and may have a disk shape.

Figure 9:
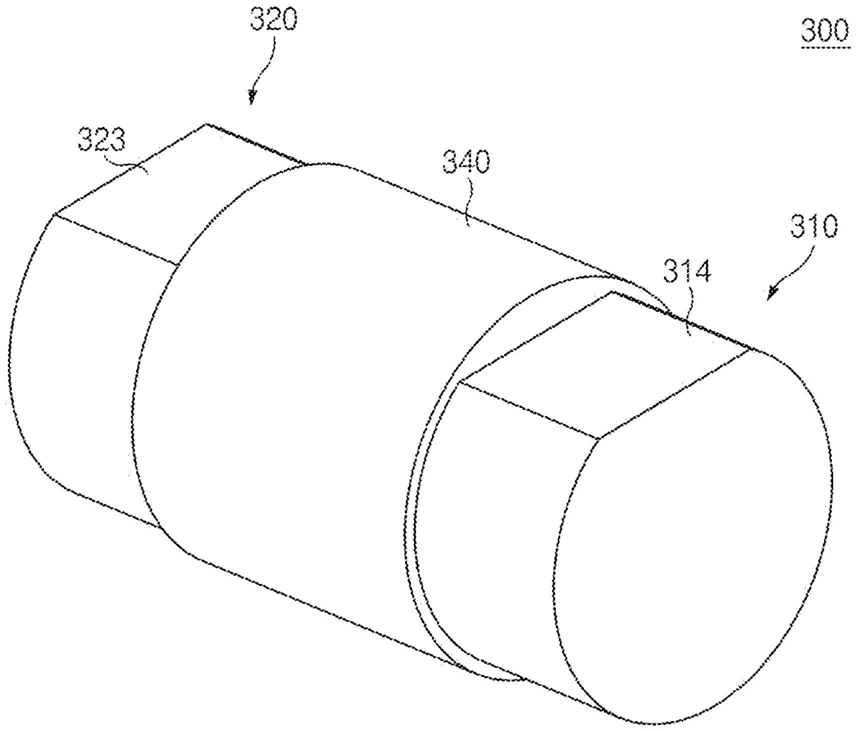
FIG. 9 is a perspective view illustrating a suspension part according to a fourth embodiment of the present disclosure.
Figure 10:
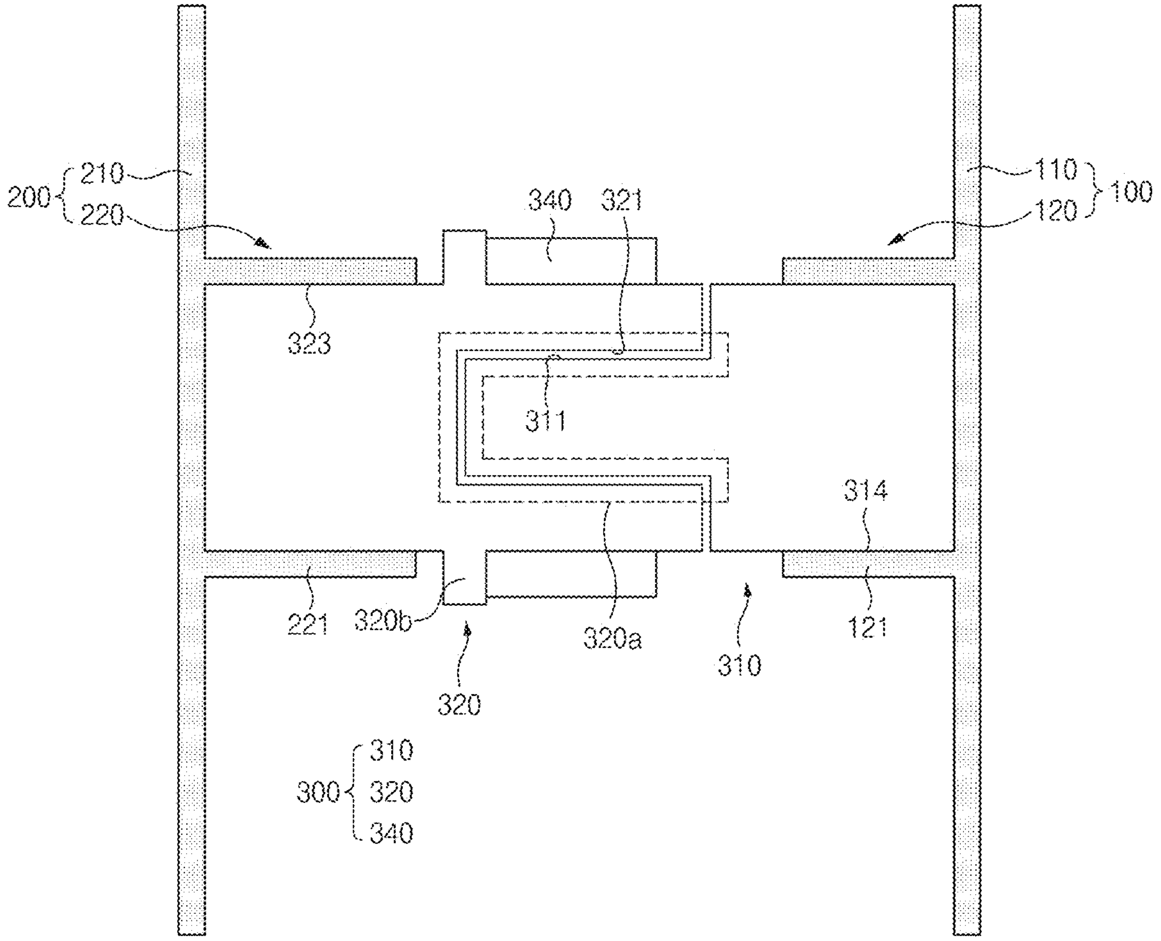
FIG. 10 is a cross-sectional view illustrating an example of a state in which a suspension part is coupled to an inner vessel part and an outer vessel part, according to the fourth embodiment of the present disclosure.
Figure 11:
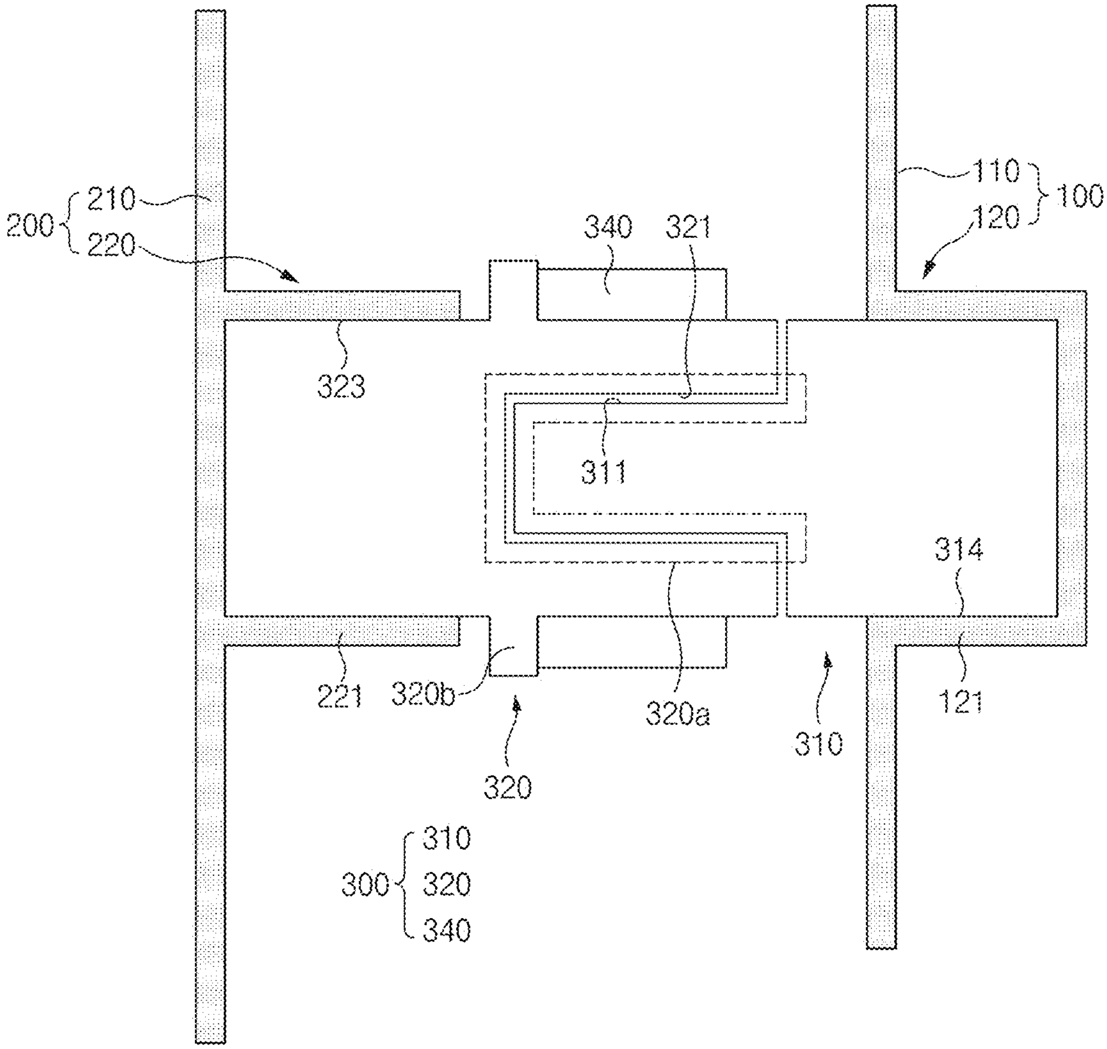
FIG. 11 is a cross-sectional view illustrating another example of a state in which a suspension part is coupled to an inner vessel part and an outer vessel part, according to the fourth embodiment of the present disclosure.

FIG. 9 is a perspective view illustrating a suspension part according to a fourth embodiment of the present disclosure. FIG. 10 is a cross-sectional view illustrating an example of a state in which a suspension part is coupled to an inner vessel part and an outer vessel part, according to the fourth embodiment of the present disclosure. FIG. 11 is a cross-sectional view illustrating another example of a state in which a suspension part is coupled to an inner vessel part and an outer vessel part, according to the fourth embodiment of the present disclosure.

As illustrated in FIGS. 9-11, according to the fourth embodiment of the present disclosure, the suspension part 300 may further include a ring member 340 that is provided to surround an outer peripheral surface of the outer member 320. In more detail, the ring member 340 may be provided to surround an outer peripheral surface corresponding to the recessed area 320*a* of the outer member 320, and may be provided to be spaced apart from the inner member 310. The ring member 340 may be a configuration for further reinforcing coupling of the inner member 310 and the outer member 320. The ring member 340 may include a metallic material that is robust to the cryogenic state.

As illustrated in FIGS. 9-11, the outer member 320 may further include a protruding area 320*b* that is provided on an outer peripheral surface of the outer member 320. The protruding area 320*b* may have a shape that extends along a circumferential direction of the outer member 320 and is provided between the ring member 340 and the outer vessel part 200. The protruding area 320*b* may be a configuration for preventing the ring member 340 from deviating from an original location.

According to the present disclosure, a problem of an insulating property of a cryogenic storage container being degraded by a suspension apparatus may be solved.

In addition, according to the present disclosure, a problem of a structural robustness of a cryogenic storage container being degraded by thermal contraction of a cryogenic storage container may be solved.

Although it is apparent that the present disclosure has been described with reference to the limited embodiments and the drawings, the present disclosure is not limited thereto, and the present disclosure may be variously carried out by a person having ordinary skill in the art within the technical spirit of the present disclosure and the equivalent ranges of the claims.

What is claimed is:

1. A fluid storage container comprising:

an inner vessel part having a first interior space for storing a fluid;

an outer vessel part having a second interior space that accommodates the inner vessel part, the outer vessel part being spaced apart from the inner vessel part outwards; and a suspension part provided between the inner vessel part and the outer vessel part, one side of the suspension part contacting the inner vessel part and an opposite side of the suspension part contacting the outer vessel part, wherein the suspension part comprises:

an inner member, one end of which is coupled to and extends outward from the inner vessel part; and an outer member, one end of which is coupled to and extends inward from the outer vessel part, the outer member being coupled to the inner member, and wherein the outer member is formed of a material having a thermal conductivity that is lower than that of the inner member.

2. The fluid storage container of claim 1, wherein a thermal expansion coefficient of the outer member is higher than a thermal expansion coefficient of the inner member.

3. The fluid storage container of claim 1, wherein the inner member comprises a metallic material, and wherein the outer member comprises a polymer material.

4. The fluid storage container of claim 1, wherein a recessed area having a recessed shape is formed in an area of the outer member that faces the inner member, and wherein the inner member is inserted into the recessed area of the outer member.

5. The fluid storage container of claim 4, wherein a first planar section is formed at a portion of a circumferentially outer surface of an area of the inner member that is inserted into the recessed area, and wherein a second planar section having a shape corresponding to the first planar section is formed in an area of an inner surface of the recessed area, which faces the first planar section.

6. The fluid storage container of claim 4, wherein a first convex-concave section protruding outwards or recessed inwards is formed at the portion of the circumferentially outer surface of the area of the inner member, which is inserted into the recessed area, wherein a second convex-concave section having a shape corresponding to the first convex-concave section is formed in an area of an inner surface of the recessed area, which faces the first convex-concave section, and wherein any one of the first convex-concave section and the second convex-concave section is inserted into the other one of the first convex-concave section and the second convex-concave section.

7. The fluid storage container of claim 1, wherein the inner vessel part comprises:

an inner body defining the first interior space; and an inner coupling area provided on one side of the inner body, into which the inner member is inserted and coupled thereto, the inner coupling area having a shape corresponding to the inner member.

8. The fluid storage container of claim 7, wherein a first planar part is formed in an area of a circumferentially outer surface of the inner member, the first planar part being inserted into the inner coupling area, and wherein a second planar part having a shape corresponding to the first planar part is formed in an area of an inner surface of the inner coupling area, which faces the first planar part.

9. The fluid storage container of claim 7, wherein a first convex-concave part protruding outwards or recessed inwards is formed in an area of a circumferentially outer surface of the inner member, which is inserted into the inner coupling area, wherein a second convex-concave part having a shape corresponding to the first convex-concave part is formed on an inner surface of the inner coupling area, and wherein any one of the first convex-concave part and the second convex-concave part is inserted into the other one of the first convex-concave part and the second convex-concave part.

10. The fluid storage container of claim 7, wherein the inner coupling area has a shape protruding from the inner body toward the inner member.

11. The fluid storage container of claim 7, wherein the inner coupling area has a shape recessed from the inner body into the first interior space.

12. The fluid storage container of claim 7, wherein the outer vessel part comprises:

an outer body defining the second interior space; and an outer coupling area provided on one side of the outer body, into which the outer member is inserted and coupled thereto, the outer coupling area having a shape corresponding to the outer member.

13. The fluid storage container of claim 12, wherein the suspension part comprises a first suspension part and a second suspension part, and wherein one or more of the first suspension part and the second suspension part are movable with respect to the inner coupling area or the outer coupling area.

14. The fluid storage container of claim 13, further comprising: a pipeline member coupled to one side of the inner vessel part, in communication with the first interior space, and provided adjacent to the first suspension part, wherein the first suspension part is fixedly coupled to the inner coupling area or the outer coupling area.

15. The fluid storage container of claim 12, wherein the suspension part further comprises a spring member provided in the outer coupling area and provided between the outer body and the outer member.

16. The fluid storage container of claim 1, wherein the suspension part further comprises a ring member surrounding an outer peripheral surface of the outer member; and wherein the outer member further comprises a protruding area having a shape that extends along a circumferential direction of the outer member on an outer peripheral surface of the outer member and provided between the ring member and the outer vessel part.

17. The fluid storage container of claim 5, wherein a cross-section of the inner member, obtained when the first planar section is cut perpendicularly to the first planar section, has a polygonal shape, and wherein a cross-section of the outer member, obtained when the second planar section is cut perpendicularly to the second planar section, has a polygonal shape.

18. The fluid storage container of claim 8, wherein a cross-section of the inner member, obtained when the first planar part is cut perpendicularly to the first planar part, has a polygonal shape, and wherein a cross-section of the inner vessel part, obtained when the second planar part is cut perpendicularly to the second planar part, has a polygonal shape.

* * * * *